UNITED STATES PATENT OFFICE.

WILHELM KRAUTH, OF GRIESHEIM-ON-THE-MAIN, GERMANY.

PROCESS OF MAKING IONONE.

SPECIFICATION forming part of Letters Patent No. 652,969, dated July 3, 1900.

Application filed December 2, 1899. Serial No. 738,944. (Specimens.)

*To all whom it may concern:*

Be it known that I, WILHELM KRAUTH, a subject of the King of Prussia, Emperor of Germany, residing at Griesheim-on-the-Main, in the Kingdom of Prussia, Germany, have invented certain new and useful Improvements in Processes for the Preparation of Ionone, (for which I have applied for a patent in Germany, dated February 3, 1899,) of which the following is a specification.

I have found that the allo-citral, an aliphatic aldehyde of the terpene series isomeric with, but different from, citral prepared synthetically by the process described in my patent application Serial No. 738,091, filed November 23, 1899, may be condensed with acetone in presence of alkaline agents to produce undecanylmethylketone of the formula:

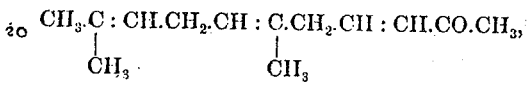

which is isomeric with pseudoionone. I have further found that this aliphatic condensation product may be inverted by dilute mineral acids into a cyclic isomerid which is identical with ionone. It follows that the double bonds of this new aliphatic condensation product are not shifted by the inversion, as Tiemann found to be the case when pseudoionone is converted into ionone, but remain in the position which they have by reason of the mode of formation.

Example: A mixture of equal parts, by weight, of allo-citral and acetone is either mixed with a small proportion of sodium ethoxid and allowed to stand for twenty-four hours or shaken for some days with saturated baryta water. The product of the reaction is mixed with water and the mixture extracted with ether. The residue left after evaporating the ether extract is treated with steam to separate unattacked aldehyde and acetone. The condensation product may be further purified by distillation in a vacuum. For inverting of this aliphatic condensation product into its cyclic isomerid twenty-two parts of volume of undecanylmethylketone are mixed with one hundred parts of water, eighty parts of glycerin, and three parts of concentrated sulfuric acid, and the mixture is boiled for several hours in a reflux apparatus. The product of the reaction is extracted with ether, and the residue left by the evaporation of the ether is boiled for some hours with sodium-bisulfite solution. Ionone is thus dissolved, and the solution may be shaken with ether to separate foreign substances. The ionone, separated from the bisulfite solution by addition of alkali, is purified by fractional distillation in a vacuum.

What I claim, and desire to secure by Letters Patent of the United States, is—

1. Process for the preparation of ionone by condensing by means of alkali allo-citral with acetone and converting the aliphatic undecanylmethylketone thus obtained into ionone by means of dilute mineral acid, substantially as described.

2. The process for the preparation of ionone consisting in first shaking a mixture of equal parts by weight of allo-citral and acetone with baryta water for several days then separating from the product of this condensation the uncondensed constituents by means of steam and finally converting the undecanylmethylketone thus obtained into ionone by boiling it with very dilute sulfuric acid to which glycerin is added to raise the boiling-point, substantially as described.

In testimony whereof I have hereunto set my hand in the presence of two witnesses.

WILHELM KRAUTH.

Witnesses:
JEAN GRUND,
RICHARD GUENTHER.